United States Patent [19]

Elsbett et al.

[11] Patent Number: 4,593,660
[45] Date of Patent: Jun. 10, 1986

[54] PISTON DRIVE FOR USE IN DIESEL ENGINES OR THE LIKE

[76] Inventors: Ludwig Elsbett; Günter Elsbett, both of Industriestrasse 14, D-8543 Hilpoltstein, Fed. Rep. of Germany

[21] Appl. No.: 478,284

[22] Filed: Mar. 24, 1983

[30] Foreign Application Priority Data

Mar. 24, 1982 [DE] Fed. Rep. of Germany ....... 3210771

[51] Int. Cl.[4] ............................................... F02F 3/00
[52] U.S. Cl. .............................. 123/193 P; 92/165 R; 92/216; 92/255
[58] Field of Search ...... 123/193 P, 193 CP, 197 AB, 123/41.72; 92/165 R, 216, 255

[56] References Cited

U.S. PATENT DOCUMENTS

| | | | |
|---|---|---|---|
| 1,617,845 | 2/1927 | Hall | 123/90.33 |
| 3,555,972 | 1/1971 | Hulsing | 123/193 P |
| 3,906,924 | 9/1975 | Elsbett | 123/41.35 |
| 4,096,844 | 6/1978 | Mackaness | 123/193 P |
| 4,129,108 | 12/1978 | Elsbett et al. | 123/41.35 |
| 4,210,468 | 7/1980 | McGee | 148/12.4 |
| 4,213,438 | 7/1980 | Elsbett et al. | 123/193 P |
| 4,286,505 | 9/1981 | Amdall | 123/41.35 |

Primary Examiner—Craig R. Feinberg
Assistant Examiner—David A. Okonsky
Attorney, Agent, or Firm—Peter K. Kontler

[57] ABSTRACT

A piston drive for use in diesel engines with a high specific liter output wherein the piston comprises discrete sealing and guiding sections and is constructed, configurated and assembled in such a way that the flow of power from the combustion zone takes place along straight paths directly from the crown to the connecting rod without causing any bending and/or other deformation of component parts of the drive. The piston drive allows for achievement of higher output, without increasing the stroke volume of the cylinder, by using relatively inexpensive piston sections and without reducing the E of the engine.

32 Claims, 16 Drawing Figures

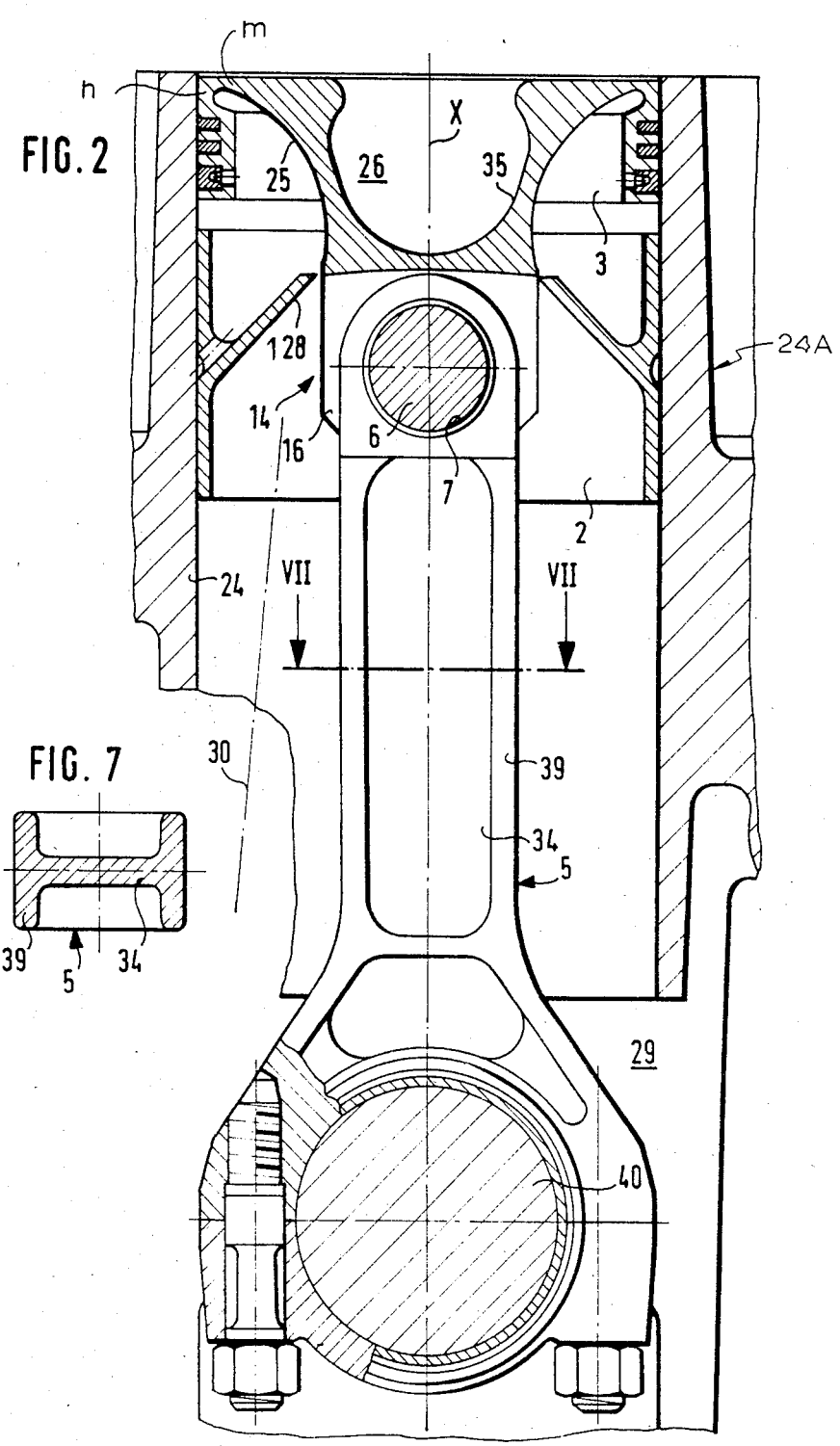

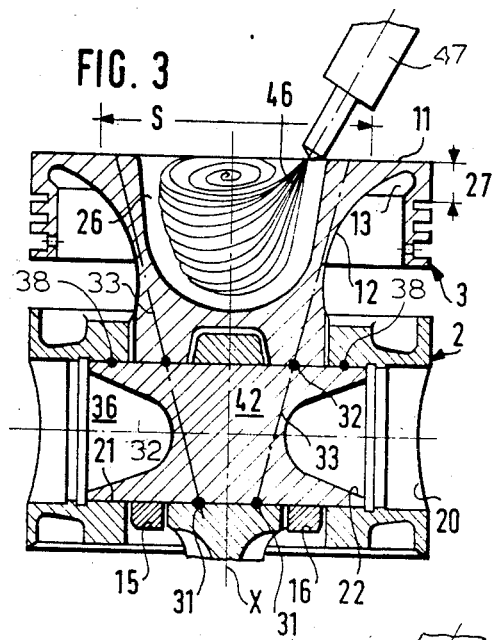
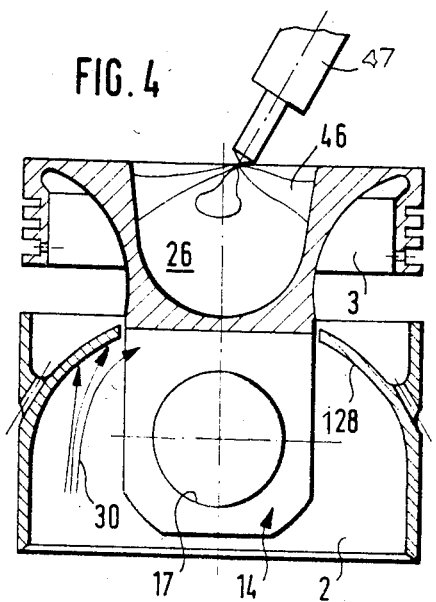
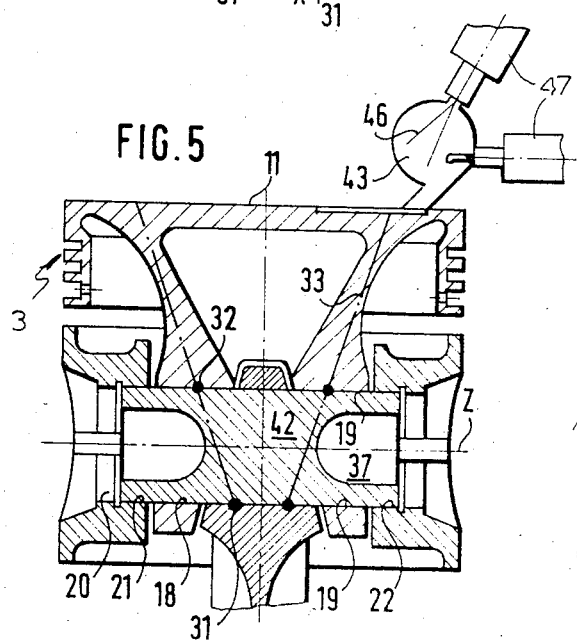
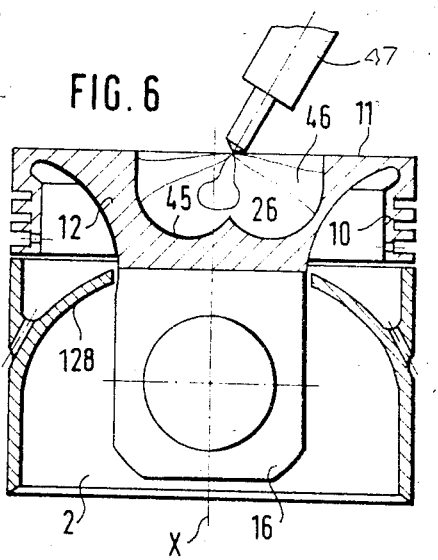

FIG. 8
FIG. 9
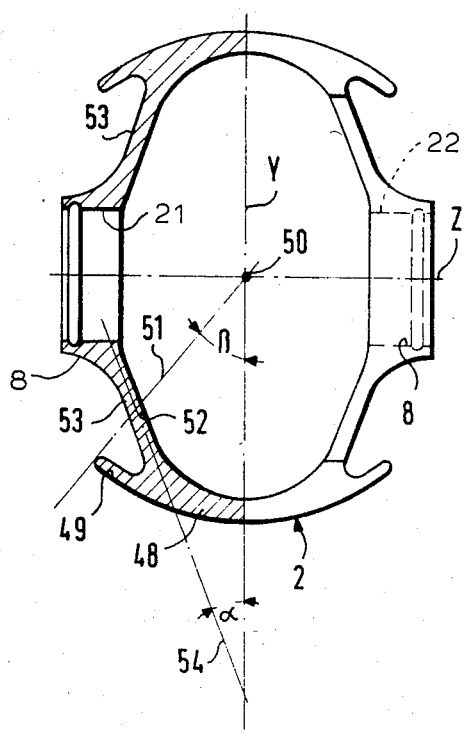
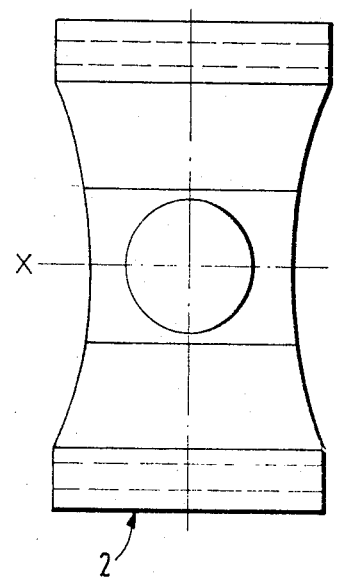

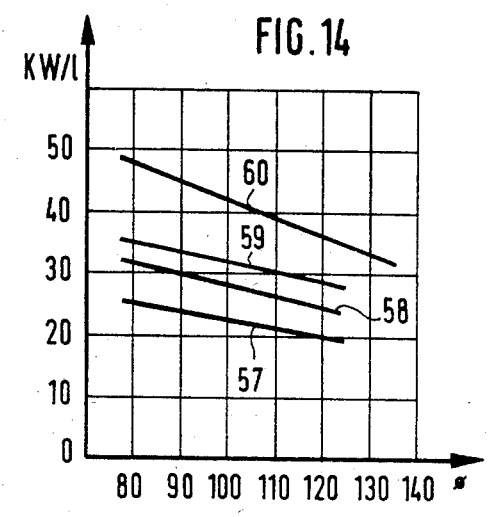
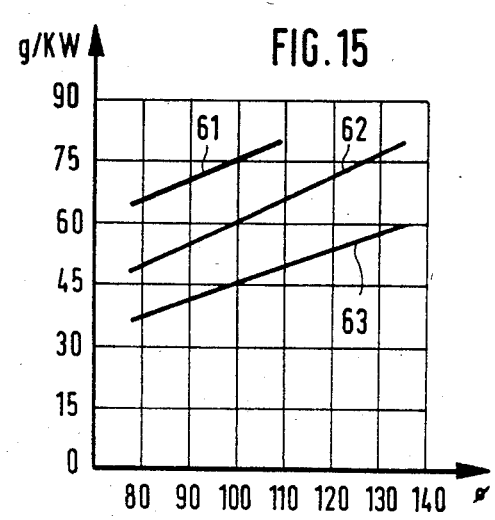
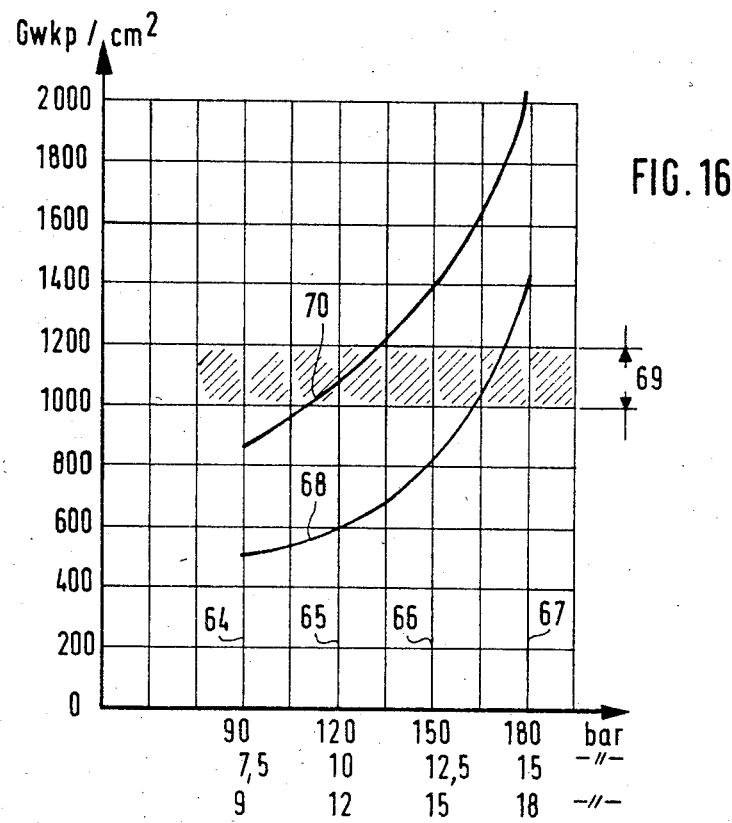

PISTON DRIVE FOR USE IN DIESEL ENGINES OR THE LIKE

CROSS-REFERENCE TO RELATED CASE

A piston drive which is similar to the piston drive of the present invention is disclosed in our copending U.S. patent application Ser. No. 478,411 filed Mar. 24, 1983 for "Power plant for use in automotive vehicles".

BACKGROUND OF THE INVENTION

The present invention relates to internal combustion engines in general, especially to diesel engines. More particularly, the invention relates to improvements in piston drives which transmit motion to the crankshafts of internal cumbustion engines. Still more particularly, the invention relates to improvements in piston drives of the type wherein the piston comprises two sections which are axially spaced apart from one another and one of which guides the other.

The other section carries one or more sealing rings which slide along the internal surface of the cylinder to seal the combustion chamber from the interior of the cylinder. The piston is coupled to a connecting rod which is connected to a crank pin of and transmits torque to the crankshaft in response to repeated combustion of a fuel-air mixture in the combustion chamber. A pivot member is provided to movably couple the two sections of the piston and the respective end portion of the connecting rod to each other.

In piston drives of the above outlined character, the sealing section of the piston comprises a crown and a carrier portion which latter mounts several sealing rings and has an external surface adjacent to the cylindrical internal surface of the cylinder. The sealing section of the piston further comprises a supporting portion which extends from the crown to the base portion of the piston and expands or diverges radially in a direction from the base portion toward the crown. It is also known to provide the sealing section of the piston with a recess or groove which is disposed between the crown and the carrier portion and is adjacent to the outermost part of the supporting portion of the sealing section. The two sections of the piston have mirror symmetrical cylindrical internal surfaces which surround the pivot member, and a further cylindrical internal surface is provided on the respective end portion of the connecting rod to surround a part of the pivot member and to thus enable the connecting rod to drive the crankshaft in response to reciprocatory movements of the piston in the cylinder chamber.

Piston drives of the above outlined character are used in a great majority of internal combustion engines, especially diesel engines, to transmit motion between the piston or pistons and the crankshaft in response to combustion of fuel in the combustion chamber or chambers. Each piston moves axially of the respective cylinder in one direction in response to expansion pressure which develops as a result of combustion of the fuel-air mixture, and the piston moves in the opposite direction in response to continuous rotation of the crankshaft. The combustion progresses in any one of a number of known ways as a result of direct or indirect injection of fuel into the combustion chamber. In presently known diesel engines, the fuel jet or a jet of fuel-air mixture which is ignited before it reaches the interior of the cylinder is directed against the wall which surrounds the combustion chamber in the piston or against the crown of the piston. If the piston is made of one or more materials which are good conductors of heat, such as aluminum, there often develop localized hot cracks or, at the very least, pronounced heat losses of the working gas, especially if the material of the piston transmits substantial amounts of heat to the cylinder and thence into the coolant of the internal combustion engine. Such piston drives are far from being satisfactory, and attempts to avoid excessive heating of the cylinder, especially in engines employing piston drives which are expected to be subjected to very pronounced stresses, include the utilization of piston drives with built up pistons which consist of steel and aluminum. The cost of such built up pistons is very high so that the piston drives employing pistons which consist of several metallic materials are used only under special circumstances. The just discussed built up pistons can be subjected to more pronounced stresses in view of the utilization of steel, and their weight is relatively low due to the utilization of aluminum. Nevertheless, there exists an urgent need for piston drives, especially for use in passenger car engines, whose weight is low or relatively low, whose cost is much less than that of piston drives using the aforediscussed built up pistons, which can stand pronounced or very pronounced stresses, and whose heat insulating properties are satisfactory in spite of the fact that the piston drives satisfy the just mentioned requirements regarding the weight, cost and resistance to stresses.

In accordance with a presently known proposal, a piston drive which is supposed to exhibit satisfactory characteristics regarding the resistance to stresses and heat insulation on the one hand, as well as relatively low weight on the other hand, employs a two-piece piston having a guiding and a sealing section, and a pivot member which couples the two sections of the piston to the connecting rod. The material of the sealing section exhibits satisfactory heat insulating properties, and the material of the guiding section is selected with a view to ensure that this section can readily slide in the cylinder of the internal combustion engine. The two sections are separated from one another by a clearance and the sealing section is formed with circumferentially complete grooves for a set of sealing rings which slide along the internal surface of the cylinder. As already mentioned above, the sealing section of the piston further comprises a supporting portion which connects the crown and the carrier portion for sealing rings with the base portion and is adjacent to the inner side of the aforementioned annular recess between the crown and the carrier. The conically outwardly diverging part of the supporting portion can surround a combustion chamber if such chamber is provided in the crown of the sealing section; the recess then constitutes a heat barrier between the combustion chamber and the carrier portion for sealing rings to prevent the transfer of substantial quantities of heat to the cylinder and thence to the cooling medium. The base portion of the piston is bifurcated, and the prongs of such base portion are mirror symmetrical to each other with reference to the axis of the cylinder. These prongs are formed with bearing portions for the pivot member. The guiding section of the piston also comprises bearing portions which surround the pivot member so that the latter couples the two sections of the piston to one another. The respective end portion of the connecting rod is provided with one or more additional bearing portions for the pivot member. In order to remove heat which develops as a result of combustion of fuel and is transmitted from the combustion chamber to the base portion of the piston, as well as to ensure adequate lubrication of the joint between the connecting rod and the two sections of the piston, the conventional piston drive further comprises a guide face which is provided at the inner side of the guiding section and is oriented and configurated in such a way that a cooling and/or lubricating medium which is sprayed against the guide face is caused to flow toward the joint, i.e., toward the pivot member in the region of the base portion of the piston. It has been found that the just discussed previously known piston drive is capable of standing pronounced stresses and also that it exhibits satisfactory heat insulating properties. Nevertheless, when the stresses are highly pronounced, it is necessary to undertake additional measures in order to prevent the application of excessive bending and/or shearing stresses to the pivot member which couples the connecting rod with the two sections of the piston. Shielding of the pivot member against excessive bending and/or shearing stresses is desirable and necessary when the pivot member is to stand surface pressures in the range of up to and even in excess of 2000 kg/cm$^2$. Reference may be had to German Offenlegungsschrift No. 25 43 478.

In accordance with a further prior proposal, and in order to ensure that the pivot member will stand highly pronounced bending and/or other stresses, the two-piece piston (which again includes a guiding and a sealing section) is constructed and assembled in such a way that the external surface of the conical supporting portion of the sealing section of the piston has a base in the region of the crown, and such base merges into the adjacent surface of the crown in the region of a so-called gravity circle whose diameter equals or closely approximates seventy percent of the piston diameter. Such connection between the base of the external surface of the conical supporting portion of the sealing section and the crown is intended to prevent bending or flexing of the crown and to ensure that the forces which develop on combustion of fuel are transmitted to the pivot member without the development of bending moments. This piston drive has found widespread acceptance in the relevant industries; however, it cannot invariably prevent the development of problems in connection with bracing of the pivot member on the connecting rod, especially when the piston drive is subjected to pronounced or highly pronounced stresses. The demands upon the stability of the piston drives are continuously on the increase, especially as concerns the static behavior of the piston drives, because such drives must stand elevated pressures in the range and even in excess of 200 bar as well as surface pressures in the range of up to and in excess of 2000 kg/cm$^2$. Under such extreme operating conditions, the pivot member is likely to undergo deformation which can entail damage to bearing portions, breakage of the pivot member and/or breakage of the guiding section of the piston. Reference may be had to German Offenlegungsschrift No. 27 17 028.

OBJECTS AND SUMMARY OF THE INVENTION

An object of the invention is to provide a piston drive which can be used in diesels and other internal combustion engines and can stand pronounced thermal stresses as well as elevated pressures without any, or without excessive, deformation of the piston, pivot member and/or connecting rod.

Another object of the invention is to provide a piston drive which exhibits the just outlined desirable features even though it is neither heavier nor more expensive than heretofore known piston drives.

A further object of the invention is to provide a novel piston for use in a drive of the above outlined character.

An additional object of the invention is to provide a novel and improved sealing section for use in the improved piston.

Still another object of the invention is to provide a novel and improved pivot member and a novel and improved connecting rod for use in the piston drive.

An additional object of the invention is to provide an internal combustion engine, particularly a diesel engine, which embodies the improved piston drive.

Another object of the invention is to provide a piston drive which can be used as a lighter, less expensive, longer-lasting and more heat and stress-resistant substitute for heretofore known piston drives.

A further object of the invention is to provide a piston drive which can be used in a wide variety of internal combustion engines irrespective of the locus of the combustion chamber and irrespective of the mode of introducing fuel or a burning mixture of fuel and oxygen into the combustion chamber.

An additional object of the invention is to provide a novel and improved guiding section for use in the piston of the above outlined drive.

The invention resides in the provision of a piston drive for use in reciprocating-piston internal combustion engines. The piston drive comprises a cylinder having a cylinder chamber bounded by an internal cylindrical surface of the cylinder, a piston which is reciprocably installed in the cylinder chamber and includes a sealing section and a guiding section for the sealing section (the two sections are spaced apart, as considered in the axial direction of the cylinder), a crankshaft, a connecting rod which is coupled to the crankshaft, and a pivot member which couples the connecting rod with the piston and movably connects the two sections of the piston to each other. The sealing section comprises a crown which is remote from the pivot member, a base portion which is adjacent to the pivot member, and a supporting portion which is coaxial with the cylinder and connects the crown with the base portion. The supporting portion diverges radially of the cylinder, as considered in a direction from the base portion toward the crown of the sealing section, and the sealing section further comprises a carrier portion which is integral with the supporting portion and has an external surface adjacent to the internal surface of the cylinder and having one or more circumferentially extending grooves for sealing rings. The crown and the carrier portion of the sealing section of the piston define an annular recess which is adjacent to the maximum-diameter part of the supporting portion. The sections of the piston and the connecting rod have internal surfaces which surround the pivot member, and the internal surfaces of the connecting rod and of the guiding section of the piston have centers located in a plane including the axis of the cylinder. In accordance with a feature of the invention, a straight line connecting such centers and extending from the base portion, through the supporting portion and to the crown is an uninterrupted straight line which is not intersected by the internal and/or external surfaces (i.e., by the contours) of the piston sections, at least in the region between the base portion and the crown. Such design of the improved piston drive greatly reduces the likelihood of or fully eliminates the bending and/or other forms of deformation of the piston drive.

The flexibility of the pivot member can be enhanced by providing its end portions with sockets which are bypassed by the aforementioned straight line. The axis of the pivot member is normal to the axis of the cylinder and is common to the sockets in the end portions of the pivot member. The two sockets are preferably mirror symmetrical to one another with reference to the axis of the cylinder. The width of the internal surface of the connecting rod, as considered in the axial direction of the pivot member, can equal or approximate the diameter of the pivot member. Also, the sealing section of the piston is preferably formed with two internal surfaces which are mirror symmetrical to one another with reference to the axis of the cylinder; each of these mirror symmetrical internal surfaces has a portion of maximum width, as considered in the axial direction of the pivot member, and such width preferably equals or approximates the diameter of the pivot member. The axial length of the pivot member preferably equals or approximates 0.7 D wherein D is the diameter of the cylinder chamber, i.e., the diameter of the piston. The peripheral surface of the pivot member is preferably hardened (e.g., as a result of treatment with boron) and can be placed into direct contact with the internal surfaces of the connecting rod, guiding section and sealing section.

If the sealing section of the piston is formed with a combustion chamber (such combustion chamber can be formed in the outer side of the crown), the surface which surrounds the combustion chamber does not intersect the aforementioned straight line, i.e., such line bypasses the surface which bounds the combustion chamber. The axis of symmetry of the combustion chamber in the crown of the sealing section of the piston preferably (but not necessarily) coincides with the axis of the cylinder.

The guiding section of the piston can be formed with two cylindrical internal surfaces which are mirror symmetrical to one another with reference to the axis of the cylinder. At least the centers of such cylindrical internal surfaces are preferably disposed within the aforementioned (so-called gravity) circle whose diameter equals of approximates 0.7 D, i.e., seventy percent of the piston diameter. The center of such gravity circle is located on the axis of the cylinder.

The recess between the crown and the carrier portion of the sealing section of the piston is preferably disposed and configured in such a way that the shortest distance between the outer side of the crown and the recess is less than the shortest distance between the recess and the external surface of the carrier portion. The ratio of such distances can be two-to-three. The outermost sealing ring (namely, the ring nearest to the exposed side of the crown) is preferably located at such a distance from the exposed surface of the crown that the recess is disposed between the outermost ring and the crown and constitutes a thermal barrier to at least reduce the transfer of heat from the crown (which is heated by combustion products) to the supporting portion of the sealing section and/or to the cylinder. The maximum diameter of the crown preferably exceeds the diameter of the external surface of the carrier portion. If the cylinder forms part of an internal combustion engine without external cooling, the diameter of the crown can exceed the diameter of the external surface of the carrier portion in the region of the outermost ring by 0.5/1000 of the diameter of the crown, i.e., by approximately five ten thousandths of the diameter of the crown. If the cylinder forms part of an engine whose cylinder is cooled by oil, the diameter of the crown can exceed the diameter of the external surface of the carrier portion in the region of the outermost ring by approximately one thousandth of the diameter of the crown. If the cylinder is cooled by water, the diameter of the crown can exceed the diameter of the external surface of the carrier portion in the region of the outermost ring by approximately two thousandths of the diameter of the crown. The diameter of the external surface of the carrier portion can decrease gradually or substantially gradually between the outermost sealing ring and the outer side of the crown at such a rate that the total reduction of this diameter is at most 1.5/1000 of the diameter of the cylinder chamber (i.e., piston diameter).

The piston preferably includes a portion having a fluid-deflecting and fluid-directing guide face which extends gradually toward the base portion of the sealing section. The just mentioned guide face can be provided on the guiding section of the piston, and the wall thickness and configuration of the guiding section are preferably such that the guide face directs a substantial quantity of a cooling and/or lubricating liquid which is sprayed or otherwise directed against the guide face toward the pivot member so that the portion which defines the guide face withdraws a substantial amount of heat from the cylinder. The liquid can be sprayed against the guide face from that portion of the cylinder chamber which surrounds the connecting rod. The guiding section of the piston can constitute or include an annulus or sleeve, or it may be substantially I-shaped and then preferably comprises two arcuate segments which slide along the internal surface of the cylinder and are preferably mirror symmetrical to one another with reference to the axis of the cylinder. At least one of these segments can be provided with a guide face for directing cooling and/or lubricating liquid toward the pivot member. The guiding section of the piston is preferably formed with two coaxial bores for the pivot member, and the common axis of such bores is normal to the axis of the cylinder; the guiding section then comprises two cylindrical internal surfaces which surround the bores and are mirror symmetrical to one another with reference to the axis of the cylinder.

It will be noted that the piston constitutes a heat insulator and that the improved drive can be provided with means for spraying coolant against the piston so that the latter draws heat from the cylinder and directs the coolant against the pivot member whereby the pivot member is properly lubricated when the engine is in use. The coolant is preferably oil, and the major part of the heat insulating action is preferably performed by the sealing section of the piston. In accordance with a presently preferred embodiment of the invention, the cylinder forms part of an oil-cooled internal combustion engine.

As mentioned above, the pivot member is preferably formed with two sockets which flank a solid central portion of the pivot member. The length of the central portion, as considered in the axial direction of the pivot member, preferably equals or approximates between 75 and 100 percent of the depth of the sockets.

If the guiding section comprises two arcuate segments which are mirror symmetrical to one another with reference to the cylinder axis, the guiding section has a second axis which is normal to the cylinder axis and such guiding section preferably further includes two bearing portions which alternate with the segments and braces which connect the segments with the neighboring bearing portions and make acute angles with the second axis. The internal surfaces which are in contact with the peripheral surface of the pivot member are provided in the aforementioned bearing portions of the I-shaped guiding section. The segments preferably include end portions which extend beyond the neighboring braces, as considered in the circumferential direction of the cylinder.

The aforementioned guide face can be provided on a piston portion which is resiliently (e.g., flexibly) connected to the guiding section of the piston. The portion which defines the guide face can be secured to or can form part of the base portion of the piston and then preferably extends from the peripheral surface of the pivot member to an internal surface of the guiding section of the piston.

The novel features which are considered as characteristic of the invention are set forth in particular in the appended claims. The improved piston drive itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary axial sectional view as seen in the direction of arrows from the line II—II of FIG. 1;

FIG. 3 is an axial sectional view of a piston with a combustion chamber whose configuration deviates from that of the combustion chamber shown in FIGS. 1 and 2, and further showing a portion of the connecting rod, a slightly modified pivot member, and a nozzle for injection of fuel into the combustion chamber;

FIG. 4 is an axial sectional view of a third piston, further showing a modified guide face for a cooling and/or lubricating fluid and a differently positioned fuel injection nozzle;

FIG. 5 is a view similar to that of FIG. 3 but showing a piston without a combustion chamber, an external combustion chamber, and two fuel injection nozzles;

FIG. 6 is a view similar to that of FIG. 4 but showing a piston having an asymmetrically disposed combustion chamber and a nozzle which is designed to inject several jets of fuel;

FIG. 7 is a sectional view of the connecting rod as seen in the direction of arrows from the line VII—VII in FIG. 2;

FIG. 8 is a partial plan and partial sectional view of a substantially I-shaped guiding section of the piston;

FIG. 9 is a view as seen from the right-hand side of FIG. 8;

FIG. 14 is a diagram wherein the curves denote the relationship between specific output and piston diameter for conventional piston drives and a piston drive which embodies the present invention;

FIG. 15 is a diagram wherein the curves denote the relationship between the weight and the diameter of the piston for conventional drives and for a piston drive which embodies the present invention; and FIG. 16 is a diagram wherein the curves denote the ability of conventional piston drives and of the improved piston drive to stand pressures and the ability of the pivot members to stand bearing stresses.

DESCRIPTION OF THE PREFERRED EMBODIMENTS

Figure 1:
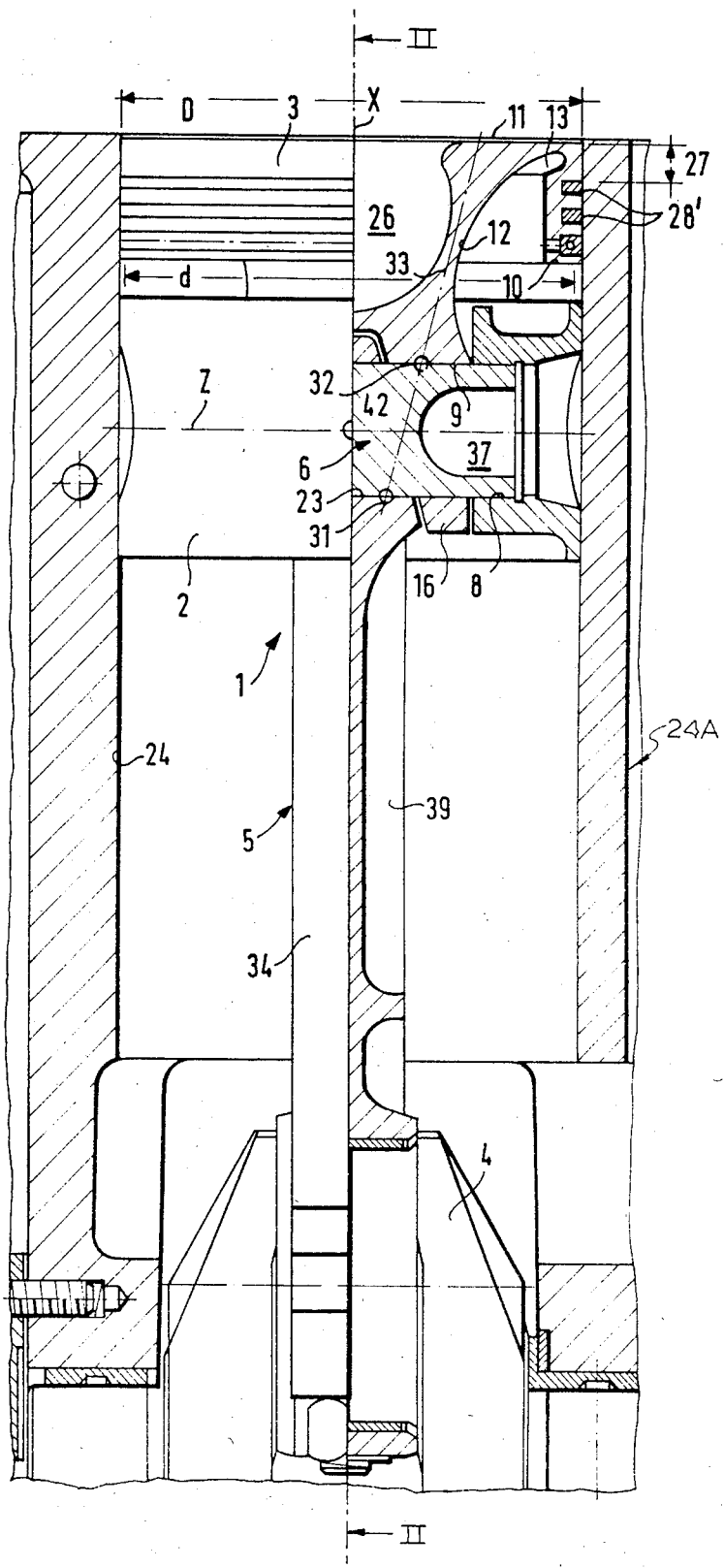
FIG. 1 is a fragmentary partly elevational and partly axial sectional view of a piston drive which embodies one form of the invention and wherein the crown of the sealing section of the piston has a combustion chamber whose axis coincides with the cylinder axis.

The piston drive 1 which is shown in FIGS. 1, 2 and 7 comprises a piston including two sections 2, 3 and a connecting rod 5 which latter transmits motion to a crankshaft 4. The section 2 is the guiding component and the section 3 is the sealing component of the piston. A pivot member 6 is provided to movably couple the piston sections 2, 3 to each other and to the corresponding annular end portion or bearing portion 7 of the connecting rod 5. The bearing portion 7 of the connecting rod 5 is coaxial with bearing portions 8 and 9 of the respective piston sections 2 and 3. The sealing section 3 includes a carrier portion 10 for a set of sealing rings 28, a crown 11 and a hollow frustoconical portion 12 which supports the crown 11. The carrier portion 10 and the crown 11 of the piston section 3 define an annular recess 13 which surrounds the outermost part of the supporting portion 12. The latter extends from the recess 13 inwardly toward the pivot member 6 and includes a pair of annular elements 15, 16 (see also FIG. 3) which are mirror symmetrical to each other with reference to a plane including the axis X of the piston drive 1. The annular elements 15, 16 form part of a foot or base portion 14 of the piston including the sections 2 and 3. The cylindrical internal surfaces 18, 19 (see FIG. 5) of the annular elements 15, 16 are in engagement with the peripheral surface of the pivot member 6. Each of these cylindrical surfaces surrounds a bore or passage 17 (see FIG. 4) in the respective annular element.

The guiding section 2 of the piston can constitute a sleeve or an I-shaped arm and is provided with two cylindrical internal surfaces 21, 22 surrounding coaxial bores 20 for the pivot member 6. The bearing portion 7 of the connecting rod 5 has a cylindrical internal surface 23 surrounding the cylindrical peripheral surface of the pivot member 6. The bearing portion 7 is substantially V-shaped so that the axial length of the internal surface 23 varies continuously, as considered in the circumferential direction of the pivot member 6. This can be readily seen in FIG. 3. The surface 23 includes two halves which are mirror symmetrical to one another with reference to a plane including the aforementioned axis X and extending at right angles to the plane of FIG. 1 or 3. FIGS. 2 and 3 further show that the width of the V-shaped bearing portion 7, as considered in the axial direction of the pivot member 6, decreases in a direction from the central portion of the connecting rod 5 toward the combustion chamber 26 in the crown 11 of the piston section 3.

The configuration of the annular elements 15 and 16 conforms to that of the V-shaped bearing portion 7, i.e., those surfaces of the elements 15 and 16 which are adjacent to the bearing portion 7 are parallel to and slightly spaced apart from the corresponding surfaces of the bearing portion 7. Those surfaces of the annular elements 15, 16 which extend radially of the cylindrical internal surface 24 of the cylinder 24A of the engine embodying the structure of FIGS. 1–2 and 7 are coaxial with the aforementioned internal surfaces 20 and 21 of the guiding piston section 2.

The frustoconical supporting portion 12 has a concave external surface 25 (note FIG. 2) and surrounds a substantial part of the aforementioned combustion chamber 26. The latter can be symmetrical or asymmetrical with reference to the axis X. FIGS. 1–2, 3, 4 and 6 show four different configurations of the combustion chamber 26.

The maximum width part of the supporting portion 12 is integral with the crown 11 of the piston section 3. The elasticity of the integral connection between the supporting portion 12 on the one hand and the crown 11 and carrier portion 10 on the other hand is enhanced by the aforediscussed concave shape of the external surface 25 of the supporting portion 12. The outermost portion 30 of the surface 25 bounds a portion of the aforementioned annular recess 13 between the crown 11 and carrier portion 10. The configuration of the recess 13 is preferably such that the ratio of thickness of the crown 11 to thickness of the carrier portion 10 in the region of the deepmost portion of the recess is at least substantially one to one-and-a-half. This can be seen in the upper left-hand portion of FIG. 2 wherein the thickness of the crown 11 is shown at m and the thickness of the carrier portion 10 (i.e., the shortest distance between the recess 13 and the external surface of the carrier portion 10) is shown at n. It will be noted that the recess 13 extends into the material of the crown 11 as well as into the material of the carrier portion 10. Thus, the thickness n of the carrier portion 10 in the region of the recess 13 is less than the thickness of the remaining part of the carrier portion 10 (namely, of that part which is provided with circumferential grooves for the sealing rings 28).

In the embodiments of FIGS. 1 to 7, the guiding section 2 of the piston is a circumferentially complete ring. FIGS. 8 to 13 show several embodiments of a substantially I-shaped guiding section. In each embodiment of the guiding section 2, the latter can include a portion having at least one internal guide face 128 whose curvature is such that it guides a spray 30 of a fluid which can constitute a coolant and/or lubricant toward the pivot member 6. The guide face or guide faces 128 can extend all the way to the innermost part of the concave external surface 25 of the supporting portion 12 and serve to guide the spray 30 toward the pivot member. The spray 30 is propelled toward the guide face 128 from a chamber 29 which is adjacent to the crankshaft 40. This ensures that heat which is generated in the combustion chamber 26 on combustion of a fuel-air mixture and is communicated to the base portion 14 can be led away from the base portion 14 and pivot member 6. The liquid droplets which form the spray 30 convey the heat to the pool of coolant (e.g., oil) without permitting such heat to reach the cylinder 24A of the engine via pivot member 6 and guiding section 2 of the piston.

The recess 13 can be said to constitute a heat barrier which prevents the transfer of heat from the crown 11 into the carrier portion 10 and especially into the portion 27 of the cylindrical external surface of the section 3. Thus, at least the major percentage of heat which is generated on combustion of the fuel-air mixture in the combustion chamber 26 is removed by the spray 30 to avoid excessive heating of the cylinder 24A. The recess 13 is particularly effective as a thermal barrier against excessive heating of that part 27 of the cylindrical external surface of the carrier portion 10 which is disposed between the outermose sealing ring 28 and the crown 11. This is highly desirable and advantageous because the sealing rings 28 and their carrier 10 are shielded against tensional stresses which would develop as a result of pronounced heating, as well as against stresses which could develop as a result of gas pressure. Therefore, that part of the carrier portion 10 which includes the portion 27 of its external surface can be maintained in sliding contact with the internal surface 24 of the cylinder 24A. To this end, the clearance between the portion 27 of the external surface of the carrier portion 10 and the internal surface 24 of the cylinder 24A is preferably minimal; it can amount to approximately 1.5/1000 of the diameter D of the crown 11 or even less. The innermost part of the carrier portion 10 (namely, that part which is located inwardly of the surface portion 27) has a diameter d which is less than the diameter of the surface portion 27 so that the part which has the diameter d and is located inwardly of the surface portion 27 is out of contact with the surface 28. In other words, the part having the diameter d is centered in the cylinder 24A exclusively by the sealing rings 28.

The diameters of the cylindrical internal surfaces 18, 19 in the annular elements 15, 16 of the piston section 3, of the cylindrical internal surfaces 21, 22 of the piston section 2, and of the cylindrical internal surface 23 of the connecting rod 5 are selected in such a way that a straight (phantom) line 33 which extends through certain parts of the surfaces 23, 18 or 23, 19 is not contacted or intersected by the outline of any part of the piston. The left-hand line 33 of FIG. 3 extends from the center 31 of the left-hand half of the surface 23, through the center 32 of the surface 18 in the annular element 15, and through the supporting portion 12 and to the crown 11. The right-hand line 33 of FIG. 3 extends from the center 31 of the right-hand half of the surface 23, through the center 32 of the surface 19 in the annular element 16, through the supporting portion 12 and to the crown 11. The two lines 33 of FIG. 3 are mirror symmetrical to each other with reference to a plane which includes the axis X and is normal to the plane of FIG. 3, i.e., normal to the axis Z of the pivot member 6. The two centers 31 and the two centers 32 are mirror symmetrical to each other with reference to the just discussed symmetry plane including the axis X. It will be noted that each of the lines 33 extends from the base portion 14 to the crown 11, i.e., from the crown to the central portion 34 of the connecting rod 5. Neither of the lines 33 is intersected by the concave surface 25 of the supporting portion 12 and/or by the surface 35 bounding the combustion chamber 26 in the crown 11 of the piston section 3. This is especially so when the combustion chamber 26 is configured in such a way that it includes two halves which are mirror symmetrical to each other with reference to a plane including the axis X.

In order to avoid undue influence upon the power flow from the crown 11 to the connecting rod 5 (in the directions indicated by the phantom lines 33), the pivot member 6 is preferably formed with pairs of cutouts or sockets 36 or 37 which are machined into or otherwise formed in the end faces of the pivot member and are bounded (at least in part) by concave surfaces which do not intersect the respective portions of the lines 33. The sockets 36 or 37 are preferably mirror symmetrical to each other with reference to the plane which includes the axis X and is normal to the axis Z of the pivot member 6. The sockets 36 (shown in FIG. 3) have a substantially V-shaped outline (as considered in the plane of FIG. 3), and the sockets 37 (shown in FIGS. 1 and 5) have a substantially U-shaped outline. The deepmost portions of the sockets 36 or 37 can be disposed close to or even very close to the respective straight lines 33. If the sockets 36 or 37 are omitted, i.e., if the pivot member 6 is formed with two flat end faces, such flat end faces evidently fail to intersect the lines 33. The provision of sockets 36 or 37 is often desirable and advantageous because they contribute to elasticity of the pivot member 6.

The centers 38 of the internal surfaces 21, 22 in the section 2 are preferably located within the confines of the gravity circle S of the crown 11. The diameter of the gravity circle S equals or approximates seventy percent of the diameter D of the piston. The two centers 38 are mirror symmetrical to each other with reference to the plane including the axis X. Such disposition of the cylindrical internal surfaces 21, 22 for the pivot member 6 ensures optimal support for the pivot member in the section 2 of the piston. It has been found that the just discussed distribution of the centers 38 within the gravity circle S reduces the likelihood of bending or flexing of the pivot member 6 (for example, such flexing or bending would take place if the pivot member were externally journalled in the guiding section of the piston).

FIG. 7 shows that the central portion 34 of the connecting rod 5 can have a substantially H-shaped cross-sectional outline with two parallel flanges 39 flanking a centrally located web. This is advantageous because the forces which are transmitted from the sections 2 and 3 of the piston toward the crank pin 40 of the crankshaft 4 are taken up and transmitted by the flanges 39.

In accordance with a presently preferred embodiment of the invention, the dimensions of the pivot member 6 are selected in such a way that its length equals or approximates the diameter of the gravity circle S. If the pivot member 6 is formed with sockets 36 or 37, the depth of such sockets preferably equals or approximates three fourths of the axial length of the central portion 42 of the pivot member, i.e., of that portion of the pivot member which is disposed between the sockets 36 or 37.

The aforediscussed configuration of the piston (so that the outlines of its sections 2 and 3 and/or of the pivot member 6 do not intersect the aforediscussed lines 33) is advantageous and desirable irrespective of the mode of combusting the fuel-air mixture and/or of the configuration of the combustion chamber. FIGS. 1 to 4 show two forms of a combustion chamber 26 which is bounded by a surface 35 having halves which are mirror symmetrical to each other with reference to each plane including the common axis X of the cylinder 24A and piston including the sections 2 and 3. FIG. 5 shows a combustion chamber 43 which is located outside of the piston, i.e., outside of the sealing section 3. The crown 11 of this embodiment of the piston is closed. FIG. 6 shows a combustion chamber 26 which is substantially kidney-shaped and wherein a nozzle 47 injects fuel radially from the center toward the wall 45 surrounding the combustion chamber. It will be noted that the combustion chamber 26 of FIG. 6 does not include two halves which are mirror symmetrical to each other with reference to a plane including the axis X; nevertheless, the lines 33 (not shown in FIG. 6) can be drawn in such a way that they are not intersected by any internal or external surfaces of the piston (and especially by none of the surfaces on the sealing section 3 of the piston). The nozzles 47 which are used for injection of fuel sprays 46 can be provided with one or more orifices, i.e., each such nozzle can discharge one or more jets of atomized fuel. For example, the nozzle 47 of FIG. 6 discharges more than two jets of fuel.

FIGS. 8 to 13 show several embodiments of a guiding section which resembles the letter I and preferably consists of a ferroalloy. This renders it possible to ensure that the section 2 of the piston conforms to the developing thermal stresses and thermal conductivity of the other (sealing) section of the piston. The guiding sections 2 of FIGS. 8 to 13 are also provided with portions having the aforementioned guide faces 128 which direct sprays of a cooling and/or lubricating agent against the pivot member which connects the sections of the piston to each other and to the respective (bearing) portion of the connecting rod. Each of the illustrated guide faces 128 can be provided on a rigid or elastic portion of the section 2.

Those portions of the I-shaped guide sections 2 in FIGS. 8 to 13 which are to engage and be guided by the cylinder (not shown) of the engine can resemble hammers or segments. Segmental cylinder-engaging portions are preferred at this time because they are simpler to manufacture. As shown in FIG. 8, the guiding section 2 can comprise two segment-shaped cylinder engaging portions 48 which are mirror symmetrical to each other with reference to a plane including the common axis X of the piston and cylinder. The length of the segments 48 (as considered in the circumferential direction of the piston) is preferably selected in such a way that a line 51 which connects an end portion or tip 49 of a section 48 with the center 50 of such section makes with the axis Y an angle beta greater than the angle alpha between the axis Y and a line 54 which extends through the intermediate portion or brace 52 connecting the corresponding segment 48 with the bearing portion 8 defining the cylindrical internal surface 21 or 22. The reference character 53 denotes the external surface of the brace 52; such surface may be parallel to the respective line 54. The axis Y is common to the segments 48 and is normal to the axis X of the piston. The axis Z is common to the bores surrounded by the surfaces 21, 22.

Figure 10:
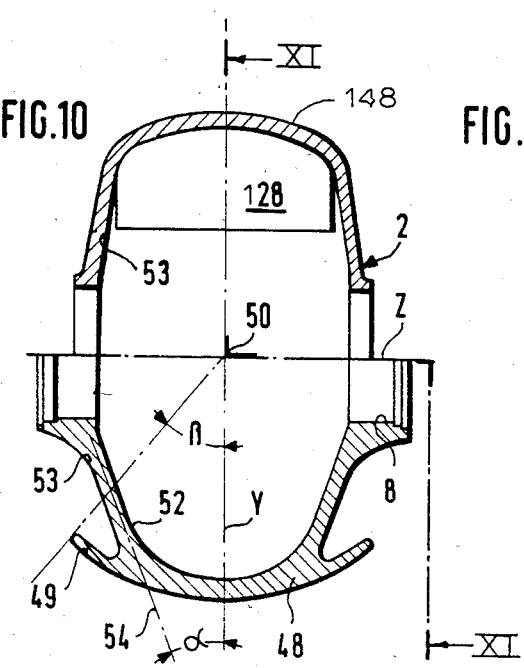
FIG. 10 is a sectional view of a different guiding section having an arcuate segment and a hammer-shaped portion disposed opposite the segment and provided with a guide face for directing a liquid toward the pivot member.
Figure 11:
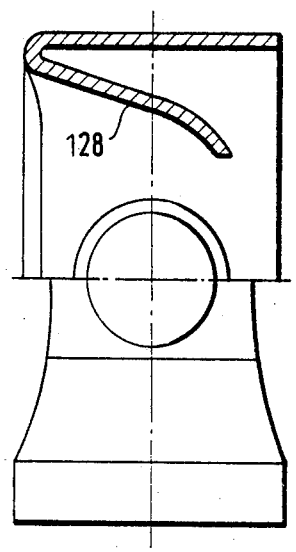
FIG. 11 is a view as seen in the direction of arrows from the line XI—XI of FIG. 10.

The guiding section 2 of FIGS. 10 and 11 includes a hammer-shaped cylinder engaging portion 148 and a segment-shaped portion 48. The guide face 128 is provided in the interior of the hammer-shaped portion 148 which extends all the way to the two bearing portions 8.

Figure 12:
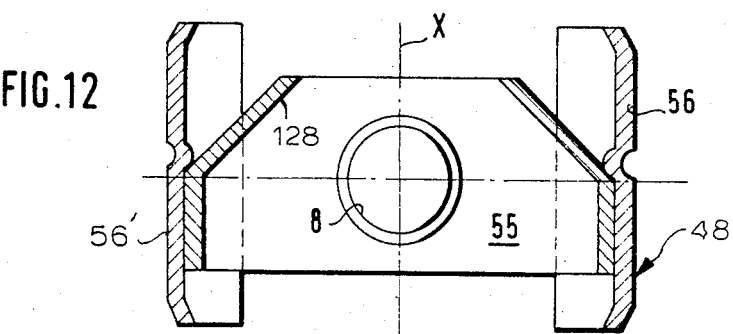
FIG. 12 is a sectional view of a composite I-shaped guiding section which is assembled of three sheet metal components, the section being taken in the direction of arrows as seen from the line XII—XII of FIG. 13.
Figure 13:
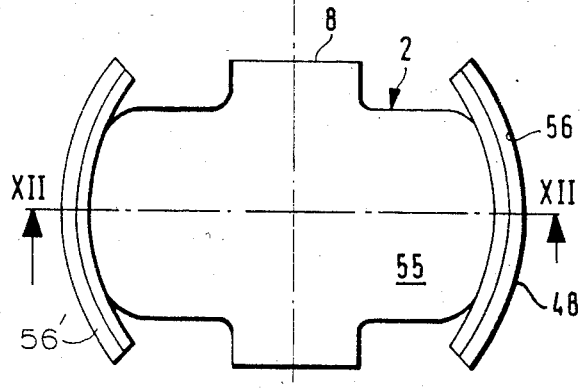
FIG. 13 is a plan view of the guiding section which is shown in FIG. 12.

FIGS. 12 and 13 illustrate a section 2 which is assembled of three sheet metal components 55, 56 and 56'. The component 55 is formed with the guide face 128 and defines the bearing portions 8. The components 56 and and 56' constitute two mirror symmetrical segments 48.

The diagrams of FIGS. 14, 15 and 16 substantiate the conclusion that, in instances when the swept capacity of the internal combustion engine is not increased and the E (epsilon) of such engine should not be reduced, it is necessary to resort to the improved piston drive 1 with its new parameters for gas pressure and piston output.

In the diagram of FIG. 14, the output in kilowatts (KW) per liter (l) of swept capacity is measured along the ordinate, and the diameter $\phi$ of the piston in mm is measured along the abscissa. The lowermost line 57 of this diagram indicates the values which can be achieved with the indicated piston diameters by resorting to a piston which is made of aluminum when the internal combustion engine (e.g., a diesel engine) constitutes a suction machine. The next line 58 indicates the output when using an aluminum piston which is cooled by a spray of fluid coolant and is designed for use in a supercharged engine. The line 59 denotes the output when using an aluminum piston with a cooling channel and the engine is a supercharged internal combustion engine. Finally, the line 60 denotes the output values which are achieved with the improved piston drive 1 in a supercharged engine. It can be readily seen that one can achieve a greatly superior specific output, especially in a supercharged diesel engine, if the piston unit is constructed in accordance with the present invention. For example, the output can be in the range of 47 KW/l when the piston unit 1 is used in a smaller internal combustion engine (such as a diesel engine for passenger cars) and 37 KW/l when the improved piston drive is installed in a larger engine (e.g., a diesel engine for trucks or other types of heavy-duty vehicles). Such output cannot be achieved with any presently known engines utilizing aluminum pistons of conventional design. The superior heat insulating properties and higher stability of the improved piston drive render the latter ideally suitable for use under such circumstances and enable it to satisfy the aforediscussed enormous requirements.

The diagram of FIG. 15 shows the weight of the piston drive 1 in relation to its output and size. The weight (in grams per kilowatt) is measured along the ordinate, and the diameter of the piston (in mm) is measured along the abscissa. The line 61 denotes the relationship for piston drives made of aluminum and used in suction machines. The line 62 denotes the ratio in supercharged engines employing aluminum pistons. The next line 63 denotes the ratio for piston drives which are constructed in accordance with the present invention and are used in a supercharged engine. It is readily recognizable that the output weight of the piston drive 1 which embodies the invention is much more satisfactory than that of conventional piston drives. The thermal insulating properties of conventional drives are inferior and they can stand much less pronounced dynamic stresses.

The loading or carrying capacity of conventional piston drives and of the improved piston drive can be ascertained by referring to the diagram of FIG. 16. The bearing stress upon the pivot member 6 (stability in kilopont per square centimeter) is measured along the ordinate up to a pressure of 2000 kp/cm². The peak pressure of 80–180 bar, the average pressure for passenger car diesel engines (between 7.5 and 15 bar) and the average pressure for heavy-duty vehicle diesel engines (between 9 and 18 bar) are measured along the abscissa.

The line 64 represents the value (i.e., the bearing load) for a suction engine, the line 65 denotes the bearing load for a supercharged antechamber diesel engine, the line 66 denotes the bearing stress for a supercharged diesel engine with direct fuel injection, and the line 67 denotes the bearing load for a high-performance diesel engine embodying the novel piston drive 1 for heavy-duty vehicle engines with an E of 17. As indicated by the curve 68, which is indicative of engines for trucks and analogous heavy-duty vehicles, the limit 69 of permissible stressing of a piston drive made of aluminum and of the bearing sleeve therefor is reached not later than at 1200 kp/cm². On the other hand, the improved piston drive (which need not be provided with a bearing sleeve) can be stressed to and beyond 1400 kp/cm² without a reduction of E. This is achieved at a peak pressure of 180 bar.

The progress of the curve 70 for passenger car engines is analogous to the progress of the curve 68 for truck engines. There are practically no limits for the novel piston drive in comparison with the aluminum pistons, i.e., the peak load upon the novel piston drive can reach 2000 kp/cm² at an E of 20.

The improved piston drive is susceptible of many additional modifications without departing from the spirit of the invention. For example, in addition to or in lieu of the guide faces 128 on the guiding section 2, a guide face can be provided on the base portion 14 of the sealing section 3 and the dimensions of the guide face on the sealing section can be selected in such a way that it extends from the region of the baring portions 8 all the way to the internal surface of the guiding section 2. Such possibility or modification can bring about advantages in connection with the making of the piston drive, especially if the guiding section 2 is made by sintering of a metallic powder.

As regards the diameter of the pivot member 6, it has been found that it preferably should equal or approximate the width of the surface 23 of the connecting rod 5 in the region closest to the central portion 34. The presently preferred axial length of the pivot member 6 has been pointed out above.

Experiments indicate that, in internal combustion engines without external cooling, the axial length of the surface portion 27 between the outermost sealing ring 28 and the piston crown 11 is in the region of 0.5/1000 of the piston diameter D (inner diameter of the cylinder 24A) at the level of the first sealing ring; in oil-cooled cylinders, the aforementioned value is preferably in the range of 1/1000 of the piston diameter; in internal combustion engines with water cooled cylinders, the aforementioned value at the same level is preferably in the range of 2/1000 of the piston diameter.

An important advantage of the improved piston drive is that it accomplishes all of the aforeenumerated objects and contributes to a pronounced reduction of specific weight of the engine (weight per unit power). This is important and advantageous because it brings about or can bring about significant advantages as concerns the energy or power consumption of small internal combustion engines. In addition, the improved piston drive renders it possible to exceed the power limits which are achievable with presently used aluminum pistons and which, at the present time, are in the range of 35 KW/liter for small internal combustion engines (e.g., those used in passenger cars) and 28 KW/liter for larger engines (e.g., those used in trucks). Such limits cannot be exceeded in accordance with heretofore known techniques, even if one employs aluminum pistons which are reinforced by steel and are provided with embedded cooling channels or the like. Furthermore, and even if it were possible to raise the aforementioned power limits with resort to aluminum pistons of presently known design, this could be achieved only by introducing larger quantities of heat into the cooling circuit (e.g., an oil circulating system) of the internal combustion engine and by resort to expensive armoring of the piston by anodic oxidation or by embedding therein components which are made of steel. As a rule, the cost of such treatment or armoring is much higher than warranted by the thus achieved improvements in performance of the engine.

The aforedescribed configuration of the piston (note the straight lines 33) renders it possible to transmit forces, which develop as a result of establishment of gas pressure in the region of the crown 11, along straight lines all the way from the crown to the base portion 14 of the piston and to the connecting rod 5. This ensures uniform distribution of stresses upon the materials and components of the piston drive, i.e., such drive reduces the likelihood of localized application of excessive stresses to the pivot member 6 and/or other parts of the piston drive. In addition, such transfer of stresses from the crown to the connecting rod reduces the likelihood of tilting of piston sections 2 and 3 in the chamber of the cylinder 24A with attendant reduction of friction between the sections 2, 3 on the one hand and the cylinder 24A on the other hand as well as with a pronounced reduction of noise when the engine is in operation.

Another important advantage of the improved piston drive is that the subdivision of the piston into two sections renders it possible to select the material of the section 2 independently of the selection of material for the section 3, and vice versa. Consequently, the materials for these sections can be chosen with a view to enable each section to optimally perform its intended function or functions. For example, the guiding section 2 can be made of steel or spheroidal graphite cast iron, and the sealing section 3 can be made of aluminum or sintered metal. The cost of such materials (namely, steel, spheroidal graphite cast iron and sintered metal) is but a fraction of the cost of aluminum, especially armored aluminum. Moreover, the improved piston drive provides room for further (future) increases in power without adversely affecting the stability and integrity of its parts; such future increases in power can be achieved without resort to armoring of aluminum pistons by steel inserts as is presently the case in many types of engines, especially supercharged engines.

The aforediscussed advantages of the improved piston drive are achieved by resorting to a separation of functions which are performed by discrete sections of the piston and by the aforediscussed design of such sections and their portions so as to allow for straight-line propagation of forces all the way from the crown 11 to the connecting rod 5. This renders it possible to subject the component parts of the piston drive to high or very high surface pressures and to achieve a high power output. Moreover, the combustion chamber in the sealing section 3 of the piston can be designed to greatly reduce heat losses, the components of the piston drive can be designed to undergo negligible deformation, the carrier portion 10 can be designed to greatly reduce the leakage of gases along the internal surface of the cylinder 24A, and the guiding section 2 can be designed with a view to reduce friction and noise to a minimum. Still further, the improved piston drive can be used with advantage in a wide variety of engines, irrespective of the mode of fuel combustion. For example, the piston drive can be used in engines wherein fuel is injected in the region of gravity circles of air layers in the combustion chamber i.e., without contact with the combustion zone and the wall surrounding the combustion chamber. Alternatively, the piston drive can be used in engines wherein fuel is sprayed onto the wall surrounding the combustion chamber and wherein the evaporated components are peeled off the wall. Still further, the injection of fuel can take place in such a way that a nozzle discharges several sprays of fuel from a locus which is disposed substantially centrally of the combustion chamber (FIG. 6) so that the jets are directed radially toward the surface surrounding the combustion chamber. It is equally possible to use the improved piston drive in engines which are designed to operate in accordance with the so-called chamber or swirl chamber method. It has been found that the aforediscussed advantages (heat insulation, statics, prevention of gas leakage, reduced friction and others) can be achieved irrespective of the mode of operation of the engine (especially as regards the manner of admission and/or combustion of fuel) and without resort to costly procedures including armoring of the piston and the like.

Still further, the improved piston drive renders it possible to apply new yardsticks regarding the gas pressure and power of the piston drive and of the engine which embodies such piston drive. For example, in heretofore known relatively small internal combustion engines for passenger cars or the like, the ratio of average pressure (pm) to maximum pressure (pmax) is or approximates 1:12. If the value of epsilon (E) is or approximates 20, and the average pressure is 15 bar (this can be achieved by injecting fuel in the region of gravity circles of air layers in the combustion chamber), the pressure of gases acting upon the piston can reach the extremely high value of 180 bar. However, if the value of E is reduced, this invariably adversely affects a diesel engine. The value of E is normally reduced to less than 1:17 only in larger internal combustion engines (e.g., diesel engines for use in trucks or other types of heavy-duty vehicles); the ratio pm/pmax is then in the range of 1:10.

An important advantage of the feature that the diameter of the crown 11 exceeds the diameter of the external surface of the carrier portion 10 in the region at 27 of the outermost sealing ring 28 and that the recess 13 is disposed between the crown and the outermost sealing ring 28 is that the recess 13 can act as a thermal barrier, i.e., the relatively thin web of material which connects the crown 11 with the carrier portion 10 reduces the rate of heat transfer from the crown to the carrier portion and thence to the cylinder 24A. This ensures satisfactory sealing of the interior of the cylinder from gases at elevated pressures and the principle of operation of the piston is altered to the extent that a highly satisfactory seal between the section 3 and the cylinder 24A is achieved (at 27) in the region outwardly of the outermost sealing ring 28. Thus, the heretofore customary expansion gap and top land are omitted and the sealing action between the cylinder and the piston begins already in a region which is located outwardly of the outermost sealing ring. This, in turn, entails a pronounced reduction of static and thermal stresses upon the critical outermost sealing ring 28. A requisite for the establishment of a gas-tight shielded oil film in this region of the piston is that the clearance should not appreciably exceed 1.5/1000 of the piston diameter D. Thus, it is not permissible to allow for relative expansion of the cylinder and piston. This is not necessary when aluminum is replaced by iron or spheroidal graphite cast iron because such materials reduce the flow of heat from the combustion chamber to the carrier portion 10 and thence to the cylinder 24A via sealing rings 28. The heat barrier which is established by the recess 13 also reduces the rate of heat transfer to the carrier portion 10 so that the sealing rings 28 are shielded from thermal stresses, i.e., from heat which is generated on combustion of fuel in the combustion chamber.

The improved piston drive 1 can operate without the customary sleeve between the pivot member 6 and the parts which are coupled to one another by such pivot member. This is due to the fact that the pivot member 6 is subject to negligible deformation or is not deformed at all. It suffices to employ a surface-hardened pivot member and to place its peripheral surface in direct contact with the internal surfaces of the connecting rod 5 and piston sections 2 and 3. As mentioned above, a boron treatment of the peripheral surface of the pivot member 6 will be satisfactory to allow for direct contact between the thus hardened peripheral portion of the pivot member and the parts 2, 3 and 5.

It is clear that, in view of the elevated average and maximum pressures (pm and pmax) to which the improved piston drive is or can be subjected, the force with which the guiding section 2 bears against the internal surface of the cylinder 24A is also increased (e.g., doubled). The guiding section 2 can stand such forces if it constitutes a genuine slide shoe. Such a guiding section must exhibit characteristics which depart from those of customary piston skirts or of pistons with oscillating shafts.

Experiments with the improved piston drive indicate that the sections 2 and 3 convey little or no heat to the wall of the cylinder 24A. It has also been found that spraying with oil (as at 30) constitutes a highly satisfactory mode of removing heat from the region of the combustion chamber. As explained above, sprays 30 of oil can be directed against the guide face 128 which is normally provided on a portion of the guiding section 2 and serves to direct the liquid medium into the region of the pivot member 6. As also mentioned above, the liquid medium which is deflected and/or directed by the guide face 128 can constitute a coolant as well as a lubricant for the pivot member 6. This practically eliminates the need for external cooling of the cylinder, especially since the effectiveness of the cooling and/or lubricating action upon the pivot member 6 can be readily regulated by appropriate selection of the configuration of guide face 128 and/or the quantity of sprayed liquid medium. This allows for a shift from conventional cooling with water or air to a cooling with oil. Cooling with oil is a prerequisite for dispensing with the conventional cylinder head gasket which is not capable of standing pressures within the aforediscussed range, namely, within a range which is achievable by resort to the improved piston drive.

Even though the improved piston drive is not affected by the selected mode of fuel admission and/or combustion, its advantages can be fully utilized especially if the fuel is injected in the region of gravity circles of air layers which circulate in the combustion chamber. By resorting to such mode of fuel injection, one avoids contact between the combustion zone and the wall of the combustion chamber by establishing and maintaining a rotating film of air along the surface which surrounds the combustion chamber. Such film is used for combustion of fuel when the mass of air within the gravity circles of the air layers is already engulfed by the combustion zone.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A piston drive for use in reciprocating-piston internal combustion engines, such as diesel engines, comprising a cylinder (24A) having a chamber; a piston (2+3) reciprocably installed in said chamber and including a sealing section (3) and a guiding section (2) for the sealing section (3), said sections being spaced apart from one another as considered in the axial direction (X) of the cylinder; a crankshaft (4); a connecting rod (5) coupled with said crankshaft; and a pivot member (6) coupling said connecting rod with said piston and movably connecting said sections to one another, said connecting rod having a central portion (39) between said pivot member and said crankshaft and said sealing section comprising a crown (11) which is remote from said pivot member, a forked base portion (14) adjacent to said pivot member and an annular supporting portion (12) coaxial with said cylinder and connecting said crown with said base portion, said supporting portion having relatively thick end portions respectively integral with said crown and said base portion and a thinner neck portion between said end portions, said forked base portion having first and second arms (16) which diverge from said supporting portion and said sealing section further including a carrier portion (10) integral with said supporting portion and adjacent to the cylinder, said carrier portion having an external surface surrounded by the cylinder and at least one sealing ring recessed into said external surface, said crown and said carrier portion defining an annular recess (13), said arms and said connecting rod having internal surfaces (18, 19 and 23) surrounding said pivot member, the internal surface of said connecting rod being divided by a first plane which includes the axis (X) of said cylinder and is normal to the axis (Z) of said pivot member into first and second surface portions of equal length and each such surface portion having a center (31) disposed midway along the respective surface portion, the internal surfaces of said arms having centers (32) each disposed midway along the internal surface of the respective arm, said centers (31 and 32) being disposed in a second plane including the axes (X and Z) of said cylinder and said pivot member, a first straight line (33) connecting the centers of the internal surface of said first arm and said first surface portion and a second straight line (33) connecting the centers of the internal surface of said second arm and said second surface portion being mirror symmetrical to each other with reference to said first plane, each of said straight lines extending from the central portion of said connecting rod, through said base portion, through said supporting portion and to said crown and being an uninterrupted line which is not intersected by the contours of said sections, at least in the region between said base portion and said crown, each of said straight lines extending substantially midway across the neck portion of said supporting portion.

2. The piston drive of claim 1, wherein the width of the internal surface of said connecting rod, as considered in the axial direction of said pivot member, at least approximates the diameter of the pivot member.

3. The piston drive of claim 1, wherein said the internal surface of each of said arms has a portion of maximum width which at least approximates the diameter of said pivot member.

4. The piston drive of claim 1, wherein the axial length of said pivot member at least approximates 0.7 D, wherein D is the diameter of said cylinder chamber.

5. The piston drive of claim 1, wherein said pivot member has a peripheral surface in direct contact with the internal surfaces of said sections and said connecting rod.

6. The piston drive of claim 1, wherein said pivot member includes two end portions and a solid central portion between such end portions, said end portions having sockets extending to the respective ends of said central portion and the length of said central portion being between 75 and 100 percent of the depth of said sockets, as considered in the axial direction of said pivot member.

7. The piston drive of claim 1, wherein said piston has a guide portion for lubricant which is directed thereagainst and is deflected by such guide portion toward said pivot member, and means for resiliently connecting said guide portion to the guiding section of the piston.

8. The piston drive of claim 1, wherein said piston has at least one guide portion for directing lubricant and/or coolant toward said pivot member, said guide portion being secured to said base portion and extending from the peripheral surface of said pivot member to an internal surface of said guiding section.

9. The piston drive of claim 1, wherein said pivot member has two end portions and sockets in said end portions, said straight lines bypassing the sockets of said pivot member.

10. The piston drive of claim 9, wherein the axis of said pivot member is normal to the axis of said cylinder and is common to said sockets, said sockets being mirror symmetrical to one another with reference to the axis of said cylinder.

11. The piston drive of claim 1, wherein said sealing section has a combustion chamber and a surface which surrounds said combustion chamber and is bypassed by said straight lines.

12. The piston drive of claim 11, wherein said combustion chamber is located centrally of said crown and has an axis of symmetry coinciding with the axis of said cylinder.

13. The piston drive of claim 1, wherein said guiding section is I-shaped and comprises two segments which are mirror symmetrical to one another with reference to the axis of said cylinder, said guiding section having a second axis which is normal to the axis of said cylinder and said guiding section further including two bearing portions alternating with said segments and braces connecting said segments with the neighboring bearing portions, said braces making acute angles with said second axis.

14. The piston drive of claim 13, wherein said segments have end portions extending beyond the neighboring braces, as considered in the circumferential direction of the cylinder.

15. The piston drive of claim 1, wherein said piston constitutes a heat insulator and further comprising means for spraying a coolant against said piston.

16. The piston drive of claim 15, wherein the heat insulator is constituted primarily by said sealing section and said coolant is oil.

17. The piston drive of claim 15, wherein said cylinder forms part of an oil-cooled internal combustion engine.

18. The piston drive of claim 1, wherein said guiding section has two internal surfaces which are mirror symmetrical to one another with reference to the axis of said cylinder.

19. The piston drive of claim 18, wherein at least the centers of the internal surfaces of said guiding section are disposed within a gravity circle whose center is located on the axis of said cylinder and whose diameter at least approximates 0.7 D wherein D is the diameter of said cylinder chamber.

20. The piston drive of claim 19, wherein said pivot member has a hardened peripheral surface.

21. The piston drive of claim 20, wherein said peripheral surface is hardened as a result of treatment with boron.

22. The piston drive of claim 1, wherein the internal surfaces fo said arms are mirror symmetrical to one another with reference to the axis of said cylinder, at least the centers of such internal surfaces being located within a circle whose diameter is or approximates 70% of the diameter of said cylinder chamber, said piston further having a fluid-deflecting and directing guide face extending gradually toward said base portion.

23. The piston drive of claim 22, wherein said guide face is provided on said guiding section of the piston, the wall thickness and configuration of said guiding section being such that said guide face directs a substantial quantity of fluid which is propelled against the guiding section toward said pivot member and withdraws a substantial amount of heat from the cylinder.

24. The piston drive of claim 22, wherein said guiding section is I-shaped and comprises two segments which are mirror symmetrical to one another with reference to the axis of said cylinder, said guide face being provided on at least one of said segments.

25. The piston drive of claim 24, wherein said guiding section has two coaxial bores surrounded by the respective internal surfaces and the axis of said bores is normal to the axis of said cylinder.

26. The piston drive of claim 1, wherein said crown has an exposed outer side, the shortest distance between said outer side and said recess being less than the shortest distance between said recess and the external surface of said carrier portion.

27. The piston drive of claim 26, wherein the ratio of said distances is two to three.

28. The piston drive of claim 26, wherein said sealing section comprises a plurality of coaxial sealing rings recessed into the external surface of said carrier portion and including an outermost ring nearest to said crown, the diameter of said crown exceeding the diameter of said external surface, said recess being disposed between said crown and said outermost sealing ring and constituting a heat barrier to at least reduce the transfer of heat from said crown to said supporting portion and the cylinder.

29. The piston drive of claim 28, wherein said cylinder forms part of an internal combustion engine without external cooling, the diameter of said crown exceeding the diameter of said external surface in the region between said outermost ring and said crown by approximately five ten thousandths of the diameter of said crown.

30. The piston drive of claim 28, wherein said cylinder forms part of an internal combustion engine whose cylinder is cooled by oil and the diameter of said crown exceeds the diameter of said external surface in the region between said outermost ring and said crown by approximately one thousandth of the diameter of said crown.

31. The piston drive of claim 28, wherein said cylinder forms part of an engine whose cylinder is cooled by water and the diameter of said crown exceeds the diameter of said external surface in the region between said outermost ring and said crown by approximately two thousandths of the diameter of said crown.

32. The piston drive of claim 28, wherein the diameter of said external surface decreases at least substantially gradually between said outermost sealing ring and the outer side of said crown at a rate such that the total reduction of said diameter is at most 1.5/1000 of the diameter of said cylinder chamber.

* * * * *